No. 838,342. PATENTED DEC. 11, 1906.
N. T. LIEN.
PLOW ATTACHMENT.
APPLICATION FILED MAR. 6, 1906.

WITNESSES:

INVENTOR
Narve T. Lien
BY
Munn & Co
ATTORNEYS

UNITED STATES PATENT OFFICE.

NARVE T. LIEN, OF BRINSMADE, NORTH DAKOTA.

PLOW ATTACHMENT.

No. 838,342.　　　　Specification of Letters Patent.　　　　Patented Dec. 11, 1906.

Application filed March 6, 1906. Serial No. 304,497.

*To all whom it may concern:*

Be it known that I, NARVE T. LIEN, a citizen of the United States, and a resident of Brinsmade, in the county of Benson and State of North Dakota, have invented a new and Improved Plow Attachment, of which the following is a full, clear, and exact description.

The purpose of the invention is to provide an attachment to plow-beams which will act to bend down stubble or weeds during the operation of plowing, insuring their being effectually covered up, and thus preventing the weeds and stubble interfering with the subsequent harrowing of the land.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in both figures.

Figure 1:
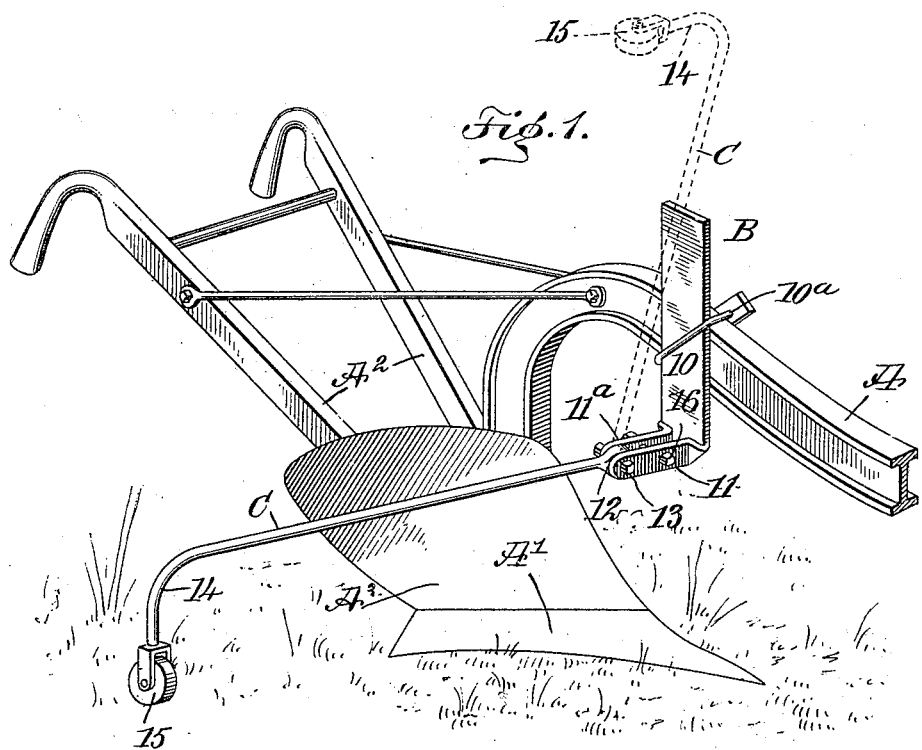
Figure 2:
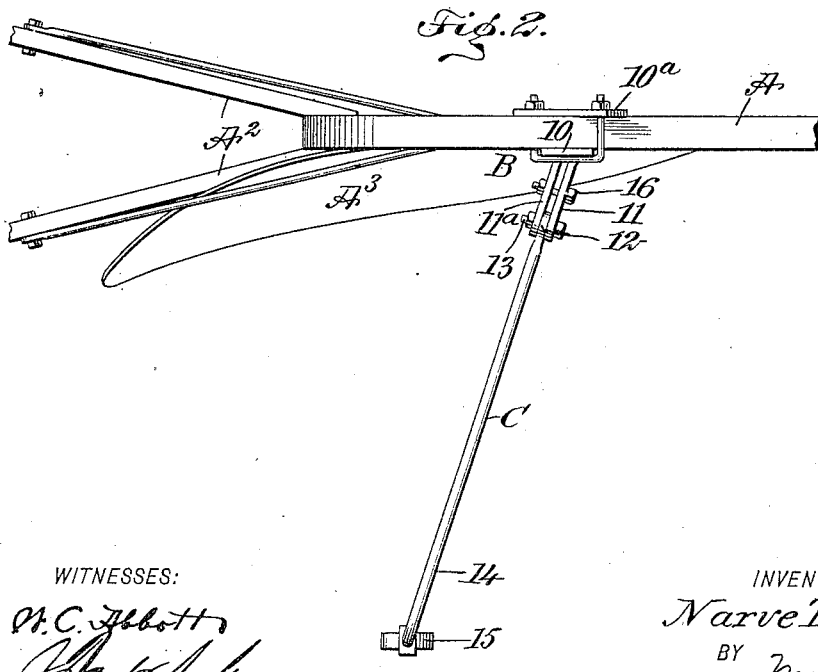

Figure 1 is a perspective view of a portion of a plow and the attachment applied thereto, and Fig. 2 is a plan view of the plow and the attachment.

A represents the plow-beam, A' the plowshare, and A² the handles attached to the said beam. The attachment consists of a bracket-section B and a bending-arm C. The bracket-section B is of angular construction, comprising an upright body member 10, clamped to the beam A by a clip 10ª of any approved construction, and horizontal lower parallel members 11 and 11ª, which extend in direction of the moldboard A³ on the plowshare A', the said bracket-section being so placed as to be in advance of the moldboard.

The horizontal members 11 and 11ª of the bracket-section B receive between them the rear eye portion 12 of the bending-arm C, a bolt 13 being passed through the said members 11 and 11ª and through the eye of the said arm, and the members 11 and 11ª of the bracket-section B are made to exert greater or less tensional control upon the bending-arm C by tightening or loosening the bolt 16, passed through the members 11 and 11ª to the rear of the pivot-bolt 13, so that the bending-arm C may be held in a desired horizontal position or in a position approaching the horizontal or may be carried up to a vertical position out of the way, as is illustrated by dotted lines in Fig. 1. The outer end portion 14 of the bending-arm C is curved downward in direction of the ground, and this curved end 14 may be provided with a wheel 15 to travel on the ground, or the said wheel may be omitted. However, in ordinary service the wheel 15 has been found desirable.

The position of the attachment is such that the bending-arm C is at more or less of an obtuse angle to the beam A, its free end being inclined somewhat to the rear of the plow, as is shown in Fig. 2. This bending-arm C as the plow is in action engages with the stubble and high weeds so common in the Western country and serves to bend such growths down and direct them to the moldboard and point of the plow, thus causing them to be buried as the plow goes through the earth, effectually preventing any inconvenience therefrom when the ground is to be harrowed.

Having thus described my invention, I claim as new and desire to secure by Letters Patent—

The combination with a plow-beam, of a bracket secured to the beam and provided at its lower end with horizontal members extending at an acute angle relatively to the beam, a bending-arm the inner end of which is pivotally secured between said horizontal members of the bracket, a bolt passed through said members of the bracket forward of its pivotal connection with the arm, whereby to increase or decrease friction on said arm, the outer end of which arm has a downward bend, and a wheel at the bent end of the arm, adapted for engagement with the ground, the said arm when not in use being folded up against its bracket-support out of the way.

In testimony whereof I have signed my name to this specification in the presence of two subscribing witnesses.

NARVE T. LIEN.

Witnesses:
　JAMES K. HARNEY,
　ALEX. GILLFILLAN.